S. A. BEMIS.
CARRIAGE-AXLE.
No. 187,585. Patented Feb. 20, 1877.
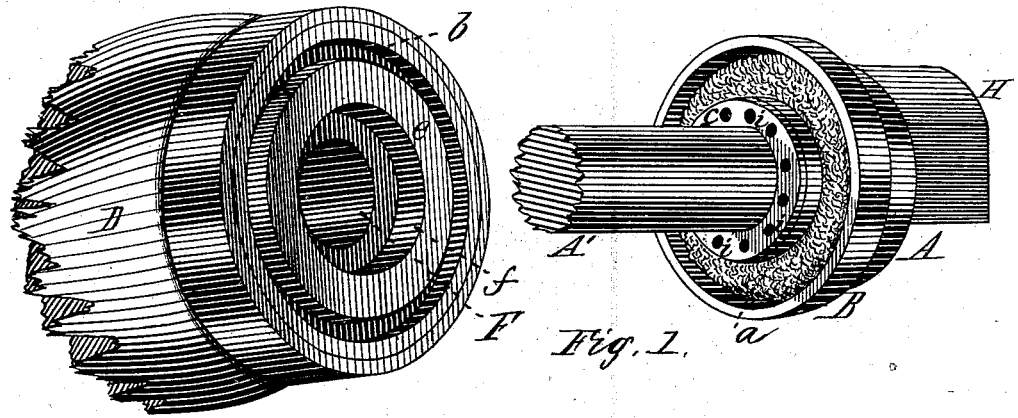
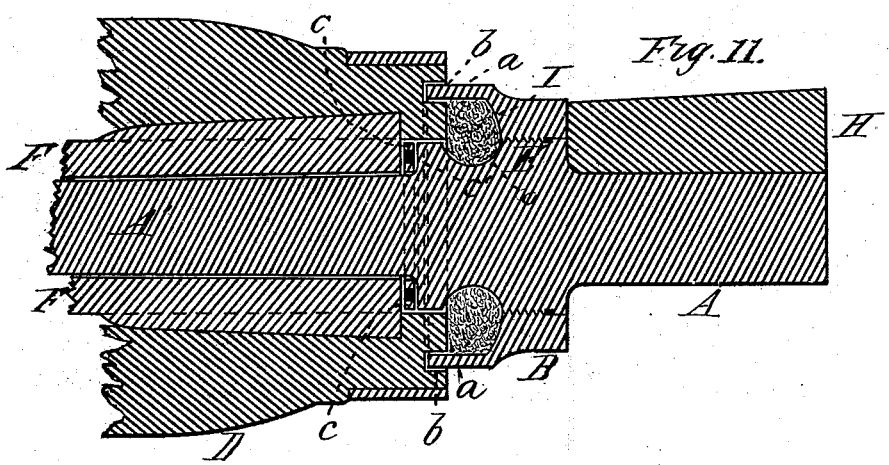
Witnesses,
C. E. Buckland,
Wm. H. Hovey.
Inventor,
Sumner A. Bemis
By T. A. Curtis,
his Atty.

UNITED STATES PATENT OFFICE.

SUMNER A. BEMIS, OF SPRINGFIELD, MASSACHUSETTS.

IMPROVEMENT IN CARRIAGE-AXLES.

Specification forming part of Letters Patent No. 187,585, dated February 20, 1877; application filed March 28, 1876.

*To all whom it may concern:*

Be it known that I, SUMNER A. BEMIS, of Springfield, in the State of Massachusetts, have invented a new and useful Improvement in Carriage-Axles; and that the following is a full, clear, and exact description thereof, reference being had to the accompanying drawings, making a part of this specification, and to the letters of reference marked thereon.

The object of my invention is to provide a metal axle, made in one piece with its arm, with a sand and lubricating box; and to this end my invention consists of an axle and its arm, both made in one piece, and provided with a shoulder projecting into the hub, and a recessed band screwed upon a threaded part of the axle, into which sponge is placed saturated with oil, and a recess is made around the axle and inside of the said band, in which a quantity of the oil is retained, and is drawn therefrom through the sponge, by the friction of the hub against the sponge, to keep up a constant lubrication by drawing the oil into the hub as fast as wanted; and it also consists of a perforated washer, placed upon the axle and against a shoulder thereon, which projects into the hub at the inner end of the axle-box, and used in combination therewith.

Figure I is a perspective view of so much of the axle and hub, separated and made according to my invention, as is necessary to show their construction; and Fig. II is a longitudinal vertical section of the same, showing the axle and hub secured together.

In the drawings, A represents the axle, having upon the part E a screw-thread, upon which is turned the threaded band B, having an annular recess, I, made therein, which recess is also continued in the axle at $o$, and provided with a projecting annular flange, $a$; and the axle is also provided with the annular shoulder $c'$ and the ordinary turned part $A'$, which is fitted properly into the axle-box F, secured in the hub D. The inner end of the hub is recessed at $b$, to receive the flange $a$, and is also recessed at $f$ to receive the shoulder $c'$ of the axle, and the washer $c$ placed thereon, which washer is perforated at suitable intervals by the holes $i$, as shown clearly in Fig. 1. The ordinary wood stock H is secured to the axle by any of the well-known means.

The operation of my invention is as follows: The band B being secured in place upon the axle, the recesses I and $o$ are filled with sponge, or other similar material, as shown clearly in the drawing. This recess $o$ made in the axle operates to retain a greater quantity of the oil for use as it is wanted than would be the case in the recess I alone, and forms a reservoir from which the oil is drawn by the friction of the hub against the sponge. The perforated washer $c$ being then placed on the axle against the shoulder $c'$, the wheel is placed in position with the inner end of the axle-box F against the washer $c$, the flange $a$ projecting into the recess $b$ in the hub, and the inner end of the hub (inside the flange $a$) against the sponge packing, and the wheel is then properly secured, the parts having been properly lubricated.

When in use upon the road, most of the sand or dirt which would gather upon the outside of the band B would drop off; but should any find its way into the recess around the flange $a$ it is carried by the motion of the hub into the recess I, and is taken up and retained by the sponge packing, which may be kept moistened with oil.

When the axle is lubricated, a considerable portion of the lubricant will enter and remain in the holes $i$ of the washer $c$, and as the carriage is used the movement of the hub will draw the lubricant out of the holes, and it will be distributed constantly upon the axle as fast as it is used up, while any small quantity of sand which may possibly find its way into the inner end of the hub will work into the said holes, and will be prevented from operating to grind and wear out the axle-box or axle working therein.

It will be seen that all the parts are so constructed that they may be easily and readily removed at any time, if disarrangement of the parts should occur, or repairs should be necessary. The packing, if saturated with the lubricant, will supply the latter to the axle-box as fast as it is needed, and will also absorb the dirt and grit, which, in small quantities, may find its way around the edge of the flange.

I am aware that sand-boxes for carriage-axles have heretofore been made, as shown in patent to J. W. Crannel, July 15, 1862, in which the sand-box is secured to a "shoe" fastened to a wooden axle, but no recess exists in the shoe or axle of that device to retain the oil, except the simple concave form of the sand-box. I am also aware that a fluted axle-box has heretofore been used, as in the patent to A. E. Smith, January 27, 1857; and I do not claim a sand-box irrespective of my arrangement of the same with the recessed axle made solid with the arm; neither do I claim a fluted axle-box in any form.

Having thus described my invention, what I claim as new is—

1. The axle A, having the shoulder $c'$ and the turned arm A', all made in one piece, in combination with the recess $o$ made in said axle, the threaded band B, and the hub recessed at $b$ to receive the flange $a$, and at $f$ to receive the shoulder $c'$, all substantially as set forth.

2. The combination of the axle A, having the shoulder $c'$, the perforated washer $c$, and the hub D recessed at $f$, and the axle-box F secured in said hub, all substantially as specified.

SUMNER A. BEMIS.

Witnesses:
T. A. CURTIS,
C. E. BUCKLAND.